Figure 1:
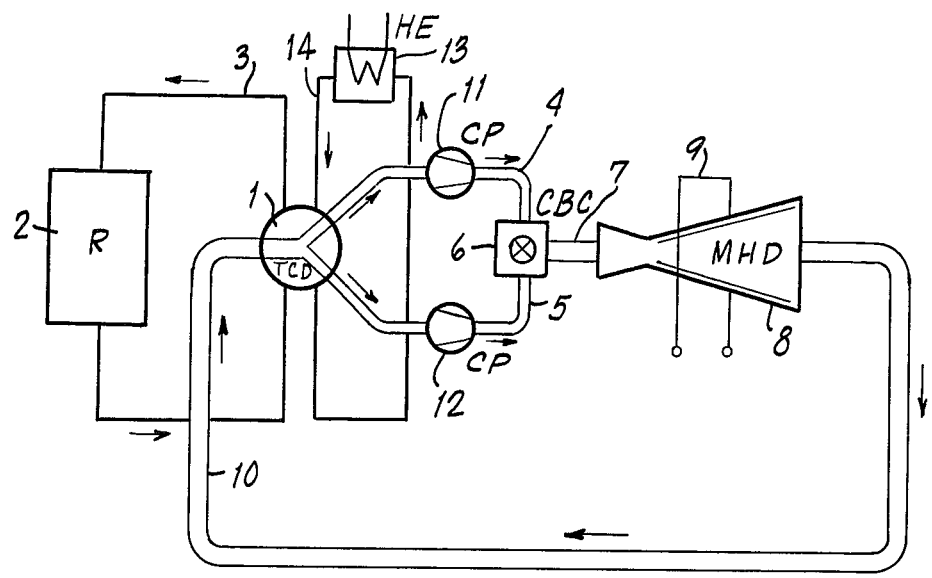

United States Patent [19]

Nakamura

[11] 3,980,907
[45] Sept. 14, 1976

[54] METHOD AND APPARATUS FOR GENERATING ELECTRICITY MAGNETO HYDRODYNAMICALLY

[75] Inventor: Takashi Nakamura, Mitaka, Japan

[73] Assignee: Asahi Kasei Kogyo Kabushiki Kaisha, Osaka, Japan

[22] Filed: Jan. 13, 1975

[21] Appl. No.: 540,331

[30] Foreign Application Priority Data
Jan. 16, 1974 Japan.................................. 49-7017
Apr. 8, 1974 Japan................................ 49-38926

[52] U.S. Cl.................................. 310/11; 310/4 R
[51] Int. Cl.²............................................ H02N 4/02
[58] Field of Search............................ 310/4, 10, 11

[56] References Cited
UNITED STATES PATENTS
1,509,103  9/1924  Elliott, Jr............................... 310/11
3,161,789  12/1964  Nagamatsu et al. .................. 310/11
3,444,401  5/1969  Gilli.................................... 310/4 X
3,477,878  11/1969  Hughes et al....................... 310/4 X

OTHER PUBLICATIONS

*Geomagnetism*, Chapman and Bartels, Oxford University Press, 1940, p. 445.

Primary Examiner—Donovan F. Duggan
Attorney, Agent, or Firm—Cooper, Dunham, Clark, Griffin & Moran

[57] ABSTRACT

Closed cycle energy conversion system in which a magnetohydrodynamic generator operates on high temperature and high pressure water obtained by combustion of hydrogen in oxygen which is obtained by thermal decomposition of water to produce electricity.

16 Claims, 4 Drawing Figures

METHOD AND APPARATUS FOR GENERATING ELECTRICITY MAGNETO HYDRODYNAMICALLY

BACKGROUND OF THE INVENTION

It is recognized that nuclear heat could be converted into electricity using a high temperature gas reactor (HTGR) — magnetohydrodynamic generator (MHD) — steam cycle with an overall efficiency higher than 50%, provided the gas temperature from the reactor reaches about 1600°C. The outlet gas temperature from presently available HTGRs is not sufficiently high to reach this efficiency, and is not likely to reach this temperature for the next several years. There remains, therefore, a qualitative gap between the maximum outlet temperature of existing and expected HTGRs and the minimum temperature necessary for efficient operation of the HTGR-MHD-steam cycle.

The process and apparatus of this invention makes possible the efficient utilization HTGR for the production of energy in a closed cycle utilizing MHD. The invention, however, is not limited to HTGR as the primary heat source.

THE INVENTION

This invention relates to a novel closed cycle energy conversion system in which water is thermally decomposed to hydrogen and oxygen which are then recombined to form high temperature high pressure water. The water is passed through an MHD generator and a portion of its enthalpy or heat energy is converted to electricity. A second portion of its heat energy is utilized to aid in the thermal conversion of the water to hydrogen and oxygen.

The invention will be more readily understood from the following description taken together with the appended drawings in which:

FIGS. 1, 2, 3 and 4 represent various embodiments of the invention.

In the description of the invention, reference will be made, for convenience, to a closed circuit for the circulation of water. It will be apparent as the description progresses that this terminology is not strictly accurate since in one phase of the cycle hydrogen and oxygen, the elements of water, are passing, and that in some phases the water is in liquid form while in others it is in the form of steam. It is not believed that the selected terminology will cause any confusion.

The various embodiments of the invention illustrated in the figures represent alternate methods of returning heat values from the MHD generator to the thermal decomposing means, as well as various methods of utilizing the energy produced in the system.

In accordance with the invention, water is thermally decomposed in thermal decomposition means 1 to produce hydrogen and oxygen. The water may be decomposed by thermal energy alone or, more conveniently, by thermochemical decomposition involving a series of reactions, the sum total of which is the conversion of water to hydrogen and oxygen.

One such series of reactions involved the use of cesium, and is indicated as follows:

$$2H_2O + 2Cs \rightarrow 2CsOH + H_2$$
$$2CsOH + 3/2O_2 \rightarrow H_2O + 2CsO_2$$
$$2CsO_2 \rightarrow Cs_2O + 3/2O_2$$
$$Cs_2O \rightarrow 2Cs + 1/2O_2$$

Another is represented by the sequence:

$$Fe + H_2O \rightarrow H_2 + FeO$$
$$3FeO + H_2O \rightarrow Fe_3O_4 + H_2$$
$$Fe_3O_4 + CO \rightarrow 3FeO + CO_2$$
$$FeO + CO \rightarrow Fe + CO_2$$
$$2CO_2 \rightarrow 2CO + O_2$$

A large number of additional reactions are illustrated and discussed by Chao in *Ind. Eng. Chem., Prod. Res. Devel.* 13, 94 (1974).

The thermal decomposition of water whether by thermochemical means or by heat energy alone is well known and need not be discussed in detail. It is sufficient to say that for many of the procedures large amounts of thermal energy are required, and that for efficient use of an MHD generator high temperatures are required.

One source of thermal energy to activate the decomposer is illustrated in the figures as a thermonuclear reactor 2 which may be a high temperature or a low temperature reactor with a coolant such as helium, carbon dioxide, liquid sodium or other conventional medium circulating in pipe 3.

Hydrogen and oxygen from the decomposer are circulated in pipes 4 and 5 to combustion chamber 6 where the hydrogen is burned in the oxygen to produce high temperature, high pressure water. Typically the water as it exits the combustion chamber will be at a pressure of from about 25 to 30 atmospheres and a temperature of about 3000°K to 3500°K.

The high temperature, high pressure water which exits the combustion chamber passes through pipe 7 to MHD generator 8 where a portion of its enthalpy or heat energy is converted to electricity in a known manner and picked up by leads 9.

FIG. 1 shows an embodiment of the invention in which the terminal energy of the effluent stream from the MHD generator is returned to the decomposer 1 with high temperature, low pressure steam as the carrier through pipe 10. The apparatus of FIG. 1 provides both heat energy and water for the decomposer 1. The heat energy supplements the heat energy from the primary heat source so as to aid in effecting the production of hydrogen and oxygen. In FIG. 1 compressors 11 and 12 are used to increase the pressure of the gaseous streams before they enter the combustion chamber.

FIG. 1 shows a heat exchanger 13 with coolant circulating through pipe 14 to function as a heat sink for the decomposer 1.

Figure 2:
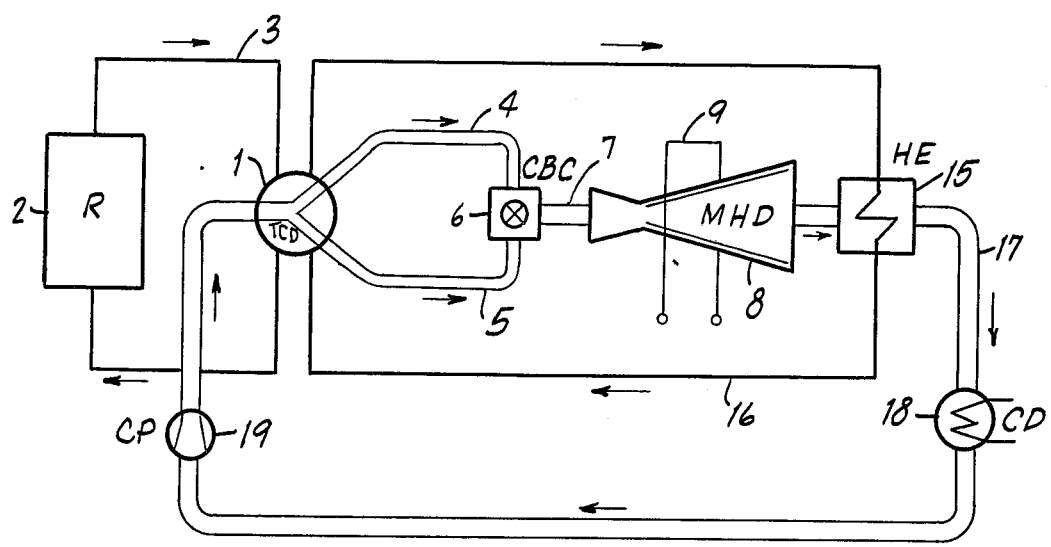

FIG. 2 illustrates an embodiment of the invention in which heat values in the effluent water stream from the MHD generator are extracted in the heat exchanger 15 by a coolant such as helium circulating in pipe 16. There heat values are returned to the decomposer 1 to supplement the heat energy of coolant 3. The effluent from heat exchanger 15 is conducted in pipe 17 through condenser 18 where it is condensed to form liquid water and then to pump 19 and finally back to the decomposer 1.

Figure 3:
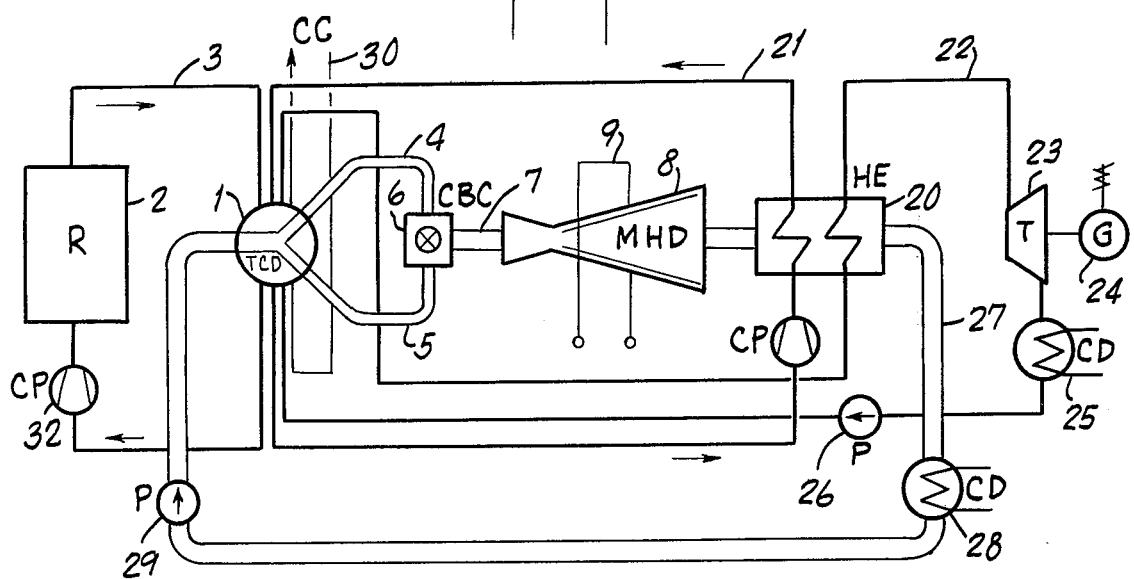

FIG. 3 shows an improved version of the invention in which the heat exchanger 20 is cooled by two streams so that two separate portions of the heat values from the effluent stream from the MHD generator are extracted. The first coolant is helium or similar coolant circulating in pipe 21 at a pressure of about 1 atmosphere and a temperature of about 1700° K to supplement the primary heat source. The second coolant is coolant steam circulating in pipe 22. The coolant steam extracts a second portion of heat energy from the effluent stream to become superheated to a temperature of about 850°K operating at a pressure of approximately 250 atmospheres. The steam actuates a turbine 23 to produce mechanical energy which may be utilized, for example, to run an electrical generator 24. The steam after passage through the turbine, is normally at a pressure of about 0.05 atmospheres and a temperature of about 310°K. It is condensed to water in condenser 25 which in turn is pumped by pump 26 to the decomposer 1 where it is again heated to form steam by recovering the rejected heat from the decomposer.

The effluent stream from the heat exchanger 20 circulates in pipe 27 back to the decomposer 1. In its passage it is condensed to water at a temperature of about 300°K and a pressure of 0.05 atmospheres in condenser 28. Pump 29 is utilized to increase the pressure of the circulating water to approximately 30 atmospheres before it returns to the decomposer. FIG. 3 shows a circulating water in circuit 30 operating as a heat sink for the decomposer, the temperature of the water normally being about 300°K at a pressure of one atmosphere.

The pressure of the steam which exits the combustion chamber 6 in the embodiment illustrated in FIG. 3 is normally about 30 atmospheres and its temperature is about 3500°K. These conditions are the usual conditions in all of the embodiments shown in the figures.

Figure 4:
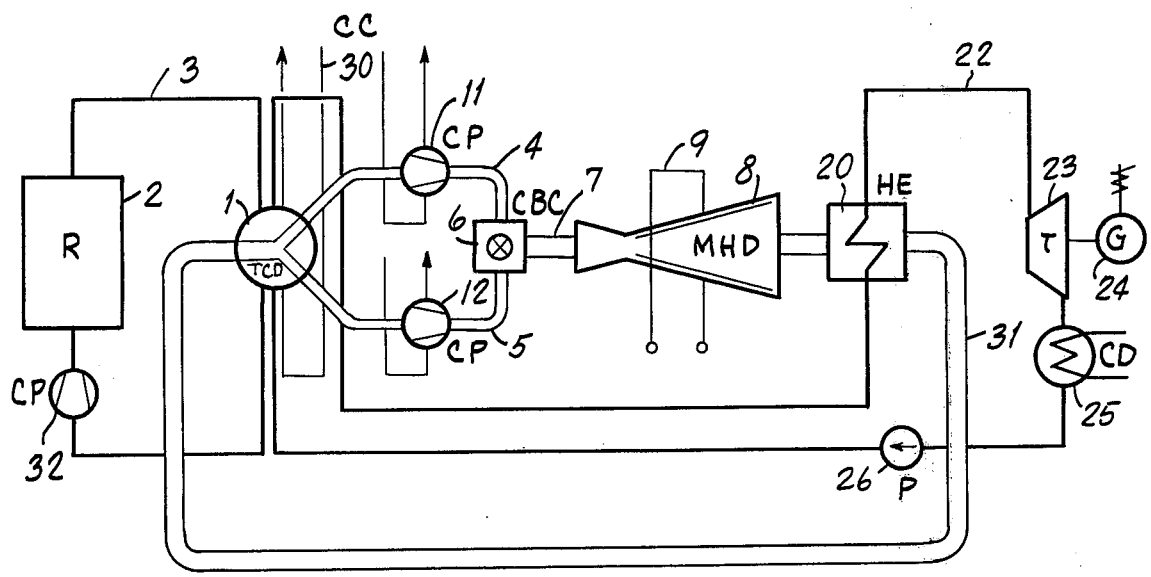

FIG. 4 illustrates an embodiment of the invention in which the heat values of th effluent stream from the MHD generator are utilized in part to operate a turbine 23 and a generator 24 as described in connection with the embodiment of FIG. 3. As described in FIG. 3 the circulating steam is condensed in condenser 25 and its pressure is increased utilizing pump 26 before returning to the decomposer 1. The major portion of the heat values in the effluent stream are returned directly to the decomposer through pipe 31 in which the steam circulates at a temperature of approximately 2000°K and a pressure of 0.3 atmospheres. The embodiment of FIG. 4 also utilizes a heat sink 30. Since the circulting steam is at a relatively low pressure, the hydrogen and oxygen produced in the decomposer are similarly at low pressures. In order to increase the combustion efficiency in the combustion chamber 6, pipes 4 and 5 are provided with compressors 11 and 12, as in the case of the embodiment illustrated in FIG. 1.

In the versions of the invention illustrated in FIGS. 3 and 4 the efficiency of the coolant circulating in pipe 3 is improved by increasing its pressure to approximately 30 atmospheres utilizing circulation compressor 32.

In all of the embodiments described the high temperature, high pressure steam entering the MHD generator is preferably seeded with cesium to aid in the conversion of heat energy to electrical energy in accordance with known techniques.

What has been described is a novel apparatus and a method for the efficient utilization of heat energy at a high temperature to produce electrical energy and mechanical energy. In the embodiments described the primary heat source, for convenience, has been illustrated as the coolant from a thermonuclear reactor. It will be apparent to those skilled in the art that other sources of heat energy at a high temperature, for example a solar furnace, could be employed.

A special feature of the invention is that, because the heat energy of the primary source is supplemented by additional heat energy from the effluent stream of the MHD generator, the possibility of choice and combination of chemicals for thermochemical decomposition is greatly increased. Additionally, the invention makes it possible to use low temperature nuclear heat as the primary heat source.

The sequence of conversion of water to hydrogen and oxygen and their reconversion to water in the combustion chamber can be initiated at start-up by providing hydrogen and oxygen from an auxiliary source.

What is claimed is:

1. A closed cycle process for magnetohydrodynamic power generation which comprises the steps of:
   1. thermally decomposing water to generate hydrogen and oxygen utilizing a primary heat source,
   2. recombining said hydrogen and oxygen in a combustion chamber to form high temperature, high pressure water,
   3. utilizing a first portion of the thermal energy in the high temperature, high pressure water to produce electrical energy by forcing the water through a magnetohydrodynamic generator thereby to produce an effluent stream of water, and
   4. returning said effluent stream to said thermal decomposing means to supplement the heat energy from said primary heat source.

2. A cycle as in claim 1 wherein said primary heat source is the cooling medium from a nuclear reactor.

3. A cycle as in claim 2 wherein said thermal decomposing means is a thermochemical decomposer.

4. A cycle as in claim 3 wherein a first portion of the thermal energy in the effluent stream is recovered by passing the effluent stream from the magnetohydrodynamic generator through a heat exchanger cooled with cooling steam, the steam thus produced is utilized to operate a steam turbine and condensed to form water which is returned to the thermochemical decomposer and converted to said cooling steam by recovering the rejected heat from said thermochemical decomposer.

5. A cycle as in claim 4 wherein a second portion of the thermal energy in the effluent stream is recovered by utilizing a second coolant in addition to the cooling steam in said heat exchanger, and said second coolant is returned to said thermochemical decomposer to supplement the heat energy from said primary heat source.

6. A cycle as in claim 3 wherein the effluent stream from the magnetohydrodynamic generator is cooled in a heat exchanger, the thermal energy recovered is returned to the thermal decomposer to supplement the heat energy from the primary heat source, and is thereafter condensed to form liquid water which is returned to the decomposer.

7. An apparatus for magnetohydrodynamic power generation which comprises:
   1. a primary heat source,
   2. a closed circuit for the circulation of water, said closed circuit including:
      a. means in operative relationship with said heat source for thermally decomposing water to produce hydrogen and oxygen,
      b. a combustion chamber downstream from said thermal decomposing means for receiving the hydrogen and oxygen thus produced and combusting same to produce high temperature, high pressure water,
      c. a magnetohydrodynamic generator operatively connected to said combustion chamber for receiving said high temperature, high pressure water and converting a portion of the thermal energy therein to electricity and producing an effluent stream of water, and d. means for returning the water from the magnetohydrodynamic generator to the thermal decomposing means to supplement the heat energy from the primary heat source.

8. An apparatus as in claim 7 wherein the said primary heat source is the cooling medium from a nuclear reactor.

9. An apparatus in claim 8 wherein said thermal decomposing means is a thermochemical decomposer.

10. An apparatus as in claim 9 further including —
   1. a heat exchanger including means for conducting cooling steam therethrough to extract a portion of the thermal energy from said effluent stream and convert said coolant steam into superheated steam,
   2. a steam turbine operatively connected to said steam conducting means to produce mechanical energy and steam at lower temperature and pressure,
   3. a condenser for converting said steam at lower temperature and pressure to liquid water, and
   4. means for returning said liquid water to the thermochemical decomposer for converting it to coolant steam by recovering the rejected heat from said thermochemical decomposer.

11. An apparatus as in claim 10 including means for conducting a second coolant through said heat exchanger and returning said second coolant, after extracting a second portion of thermal energy from said effluent stream, to said thermochemical decomposer to supplement the heat energy from the primary heat source.

12. An apparatus as in claim 9 further including:
   1. a heat exchanger downstream from the magnetohydrodynamic generator,
   2. means for conducting a coolant through said heat exchanger and returning said coolant, after extracting thermal energy from said effluent stream, to said thermochemical decomposer to supplement the heat energy from the primary heat source, and
   3. a condenser to convert the steam in the effluent stream to water, said condenser being operatively connected to said thermochemical decomposer for conducting the water to the decomposer.

13. A cycle as in claim 1 wherein said thermal decomposing means is a thermochemical decomposer.

14. A cycle as in claim 1 wherein a first portion of the thermal energy in the effluent stream is recovered by passing the effluent stream from the magnetohydrodynamic generator through a heat exchanger cooled with cooling steam, the steam thus produced is utilized to operate a steam turbine and condensed to form water which is returned to the thermal decomposer and converted to said cooling steam by recovering the rejected heat from said thermal decomposer.

15. An apparatus as in claim 7 wherein said thermal decomposing means is a thermochemical decomposer.

16. An apparatus as in claim 7 further including:
   1. a heat exchanger including means for conducting cooling steam therethrough to extract a portion of the thermal energy from said effluent stream and convert said coolant steam into superheated steam,
   2. a steam turbine operatively connected to said steam conducting means to produce mechanical energy and steam at lower temperature and pressure,
   3. a condenser for converting said steam at lower temperature and pressure to liquid water, and
   4. means for returning said liquid water to the thermal decomposer for converting it to coolant steam by recovering the rejected heat from said thermal decomposer.

* * * * *